United States Patent

Pilditch

[15] 3,676,920

[45] July 18, 1972

[54] JOINING PROCESS FOR THE ASSEMBLY OF DECORATIVE, STAINED GLASS

[72] Inventor: Robert M. Pilditch, 2810 Garfield St., Bay City, Mich. 48607

[22] Filed: June 22, 1970

[21] Appl. No.: 48,275

[52] U.S. Cl.............................29/472.5, 29/472.7, 52/747
[51] Int. Cl.......................................................B23k 31/02
[58] Field of Search...............161/36, 196; 29/472.5, 472.7; 52/415, 475, 741, 747

[56] References Cited

UNITED STATES PATENTS

| | | | |
|---|---|---|---|
| 274,948 | 4/1883 | La Farge | 161/37 |
| 2,228,352 | 1/1941 | Hopfield | 161/196 X |
| 2,198,578 | 4/1940 | Hazelton, Jr. et al. | 161/196 X |
| 3,537,944 | 11/1970 | Grubb et al. | 161/196 X |
| 271,697 | 2/1883 | Friedrick | 52/741 |
| 1,542,564 | 6/1925 | Liese | 52/475 X |
| 2,526,752 | 10/1950 | Horstman et al. | 52/475 |
| 2,927,355 | 3/1960 | Rosmussen | 52/475 X |
| 3,226,903 | 1/1966 | Lillethur | 52/475 X |
| 3,267,569 | 8/1966 | Eichborn et al. | 52/741 X |
| 3,591,992 | 7/1971 | Pawlicki | 52/475 X |

OTHER PUBLICATIONS

Robert H. Dalton, " Glass–to–Metal Joints," Product Engineering, April 26, 1965, pp. 62– 71.

*Primary Examiner*—John F. Campbell
*Assistant Examiner*—Ronald J. Shore
*Attorney*—Robert J. Rhead

[57] ABSTRACT

This process relates to the assembly of decorative, stained glass, whereby a polygon-edged pane of stained glass is edged with a thin strip of metal. This edging of the polygon pane of stained glass with thin strips of metal is repeated on other panes until there is present the desired number of panes. These edged panes of stained glass are now assembled by soldering the thin metal strips with soldering composition under appropriate soldering means, whereby there is assembled the desired decorative, stained glass configuration.

5 Claims, 3 Drawing Figures

Patented July 18, 1972 3,676,920
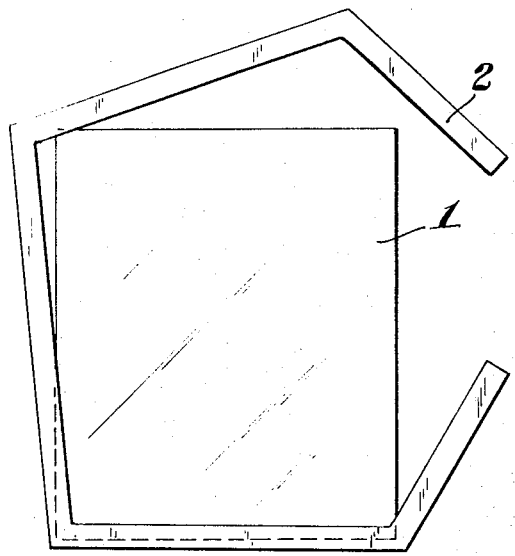
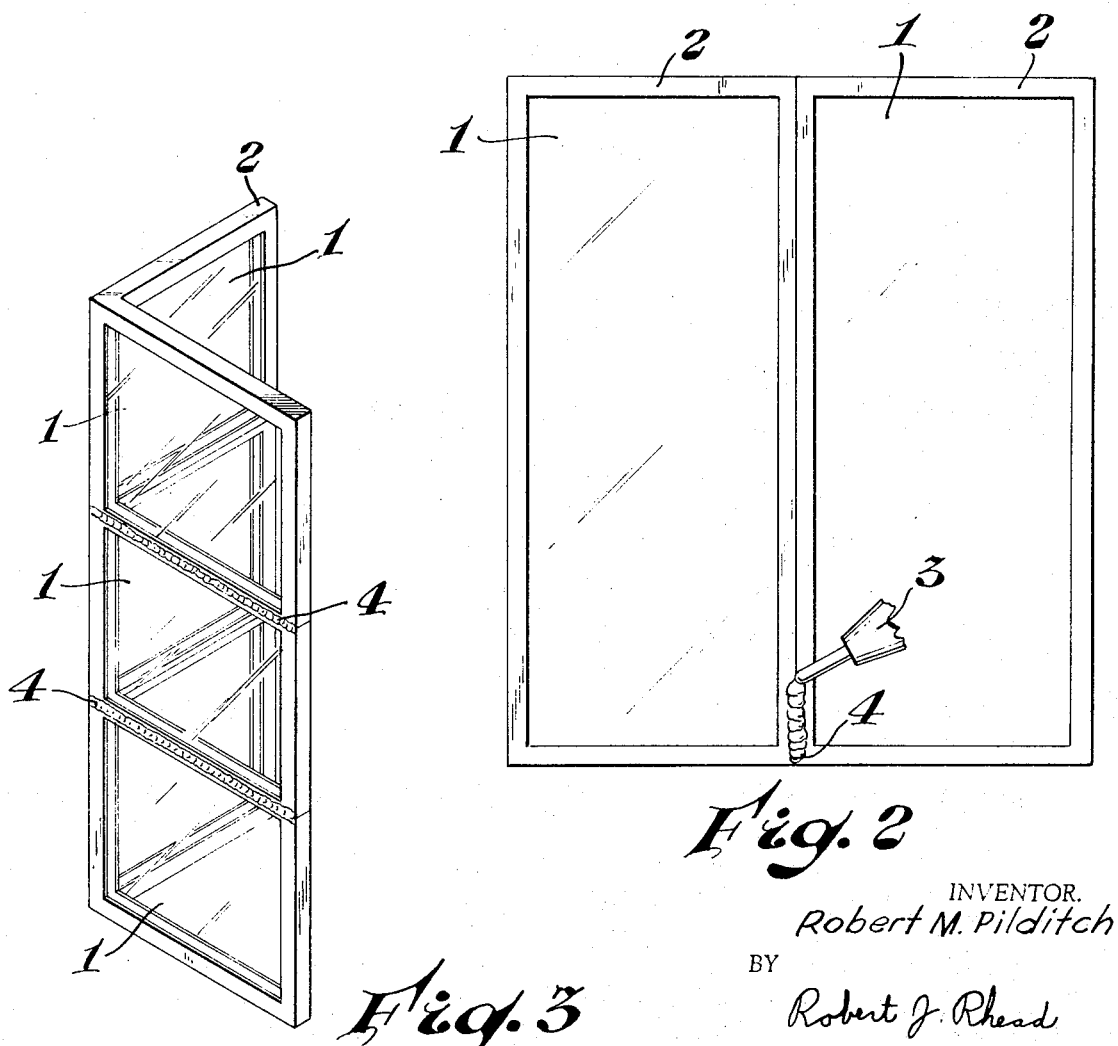
INVENTOR.
Robert M. Pilditch
BY
Robert J. Rhead
ATTORNEY

JOINING PROCESS FOR THE ASSEMBLY OF DECORATIVE, STAINED GLASS

This invention relates, generally, to a process for the joining and/or assembling of decorative, stained glass. In particular, this invention relates to a process for the simple, economical assembly of decorative, stained glass lamps, candle shades, sanctuary lights, decorative dishes and various other objects.

The art of glass-to-metal sealing has been practised for centuries. In most cases, joints between metal and glass are made at elevated temperatures, where the softened glass flows around the oxidized metal with or without the application of mechanical pressure and some other oxide diffusing into the glass. On cooling of the joint, a permanent bond between the components has been established where all necessary precautions have been taken to ensure the compatibility of the chosen materials. Certainly, one of ordinary skill-in-the-art would have to select the appropriate glass composition, the appropriate elevated temperature, the appropriate oxidized metal and, finally, the appropriate method of each item to make them compatible with each other.

Matched seals are those types of glass-to-metal seals which satisfy the above conditions, such as, having the same coefficient of expansion and the same softening point. Glass and metal should preferably be selected so that their expanding and contracting characteristics are the same or nearly the same and, further, that on cooling from the elevated sealing temperature no mechanical stresses are imposed in the seals. This, again, requires a great deal of skill in selecting the appropriate metal or alloy and/or the appropriate glass or glass composition. Certainly these stresses in the glass can be overcome by annealing, but this again requires an additional process step.

Mismatched seals again find wide use in various industrial applications, but up to this point little or no application in the production of decorative, stained glass has been known. Up to this point, decorative, stained glass assembly has centered around the use of the historical process of channeled lead glass, wherein the artist had to be an exceptionally gifted and studied craftsman so as to produce the right alloy of lead with the right composition of glass to assure the successful completion of such works of art as, cathedral stained-glass windows, shades and various other artifacts.

It is an object of this invention to provide a new and unobvious process for the assembly of various decorative, stained glass artifacts.

It is a further object of this invention to provide a process for the assembly of various decorative, stained glass artifacts wherein a metal strip is positioned around the edge of the glass pane and this is repeated until there are obtained sufficient edged glass panes so as to permit them to be soldered together thereby forming a desired glass configuration.

Other objects and advantages of the invention will be pointed out specifically or will become apparent in the following description when it is considered in conjunction with the appended claims and the accompanying drawings. Other objects will be apparent to those skilled in the art upon examination of the following specification.

In accordance with certain of its aspects, this invention comprises a joining process for the assembly of decorative, stained glass, which in turn comprises: the selecting of a polygon-edged pane of stained glass; manually positioning a strip of metal selected from the group consisting essentially of copper, nickel, lead, tin and chromium, along the polygon-edged pane of stained glass and manually positioning a second strip of metal selected from the group consisting essentially of copper, nickel, lead, tin and chromium, along the second polygon-edged pane of stained glass; juxtapositioning the polygon-edged pane of stained glass with the second polygon-edged pane of stained glass; joining the strip of metal to the second strip of metal with an appropriate soldering torch means by a soldering composition consisting essentially of tin, lead, antimony, bismuth, cadmium and aluminum; forming the jointed, polygon-edged stained glass to the desired configuration; and, allowing the soldering composition to air dry.

The structural details, principles, advantages and utility of this process, constructed in accordance with the invention, will become apparent from the following description of the best model now contemplated for carrying out the invention, the description being made with reference to the accompanying drawings, wherein:

FIG. 1 is a view and perspective showing a front view of a typical polygon-edged pane of stained glass properly positioned, a strip of metal;

FIG. 2 is again a front view showing a typical assembly of two polygon-edged panes of stained glass, wherein the assembly process is being completed; and, FIG. 3 is a three-dimensional perspective illustrating an assembled multiple combination of polygon-edged panes of stained glass which have been assembled in accordance with this invention.

In the embodiments illustrated, a polygon-edged pane of stained glass 1 having a plurality of edges is positioned in such a way in relation to a strip of metal 2 wherein the strip of metal 2 is manually positioned continuously along the polygon-edged pane of stained glass 1.

As shown in FIG. 2, a second polygon-edged pane of stained glass 1 having manually positioned thereon a strip of metal 2 being placed in juxtaposition with each other, are manually assembled by a soldering composition 4 by an appropriate soldering torch means 3 whereby there is formed a joined, polygon-edged, stained glass configuration.

FIG. 3 is a three-dimensional view illustrating the combined assembly, manually polygon-edged, stained glass panels, assembled in a multiple configuration.

In accordance with the present invention, decorative, stained glass configurations may be assembled in a short period of time and by a very simple means.

A pane of glass is selected according to the desired size, shape and the quality of the desired object to be assembled. Any suitable decorative glass is compatible with this invention. The decorative glass may be any size, shape or thickness. The decorative glass can be transparent, translucent or opaque. Further, the glass may have imprinted thereon various designs, etchings or other artistic mechanical and/or chemical imprints.

Preferably the glass is a colored pane of decorative glass. Further, the glass is of a rectangular shape and is preferably three-sixteenths of an inch in thickness. A typical pane of decorative glass may be of the size measuring 3½ × 3½ × 3/16 inches. A second typical pane of decorative glass may be 1½ ×6 × 3/16 inches. The size and configuration of the selected pane of decorative glass is only controlled or restricted by the configuration of the object to be assembled.

It is preferable in the practice of this invention to employ a base upon which is formed, by the use of straight edges, a right angle. This right angle can be formed by affixing to a solid surface, for example, plywood board, strips of wood to form a right angle. This base facilitates the practice of this invention in that it permits the correct lining up of the decorative panes of glass at right angles and, further, permits the steadying of the glass panes. The use of this base merely indicates the best mode of the invention.

According to the practice of this invention, a strip of metal selected from the group consisting essentially of copper, nickel, lead, tin and chromium is required. A quality grade of copper, nickel, lead, tin and chromium is suitable for the practice of this invention. This quality grade of the above metals should be of such a grade as to readily permit flexibility. This metal should be approximately one-half inch wide. Further, the surface of the above metals should be of such a nature as to be readily receptive to a soldering composition. By this is meant that the surface of the metals should be chemically free of impurities that would interfere with or hinder the soldering composition from adhering to the metal surface.

Preferably, the metal used in the practice of this invention is copper. Further, copper of the gauge of 36, 38 and 40 is the most desirable. Copper is readily available and impurities in the metal are not detrimental to the practice of this invention provided that the copper is still capable of receiving a solder composition.

In the practice of this invention, a soldering means is required. Soldering means, in this invention, encompasses any and all types of soldering irons or torches. All types of soldering torches—either those which are self-contained or electrical—are applicable to this invention. Preferably, the self-contained soldering torch is desirable. More preferable is a self-contained minitorch which is capable of developing 3,500° F and is most desirable. These minitorches use a self-contained butane charger and are ideally suited for delicate and intricate soldering, such as is used in the jewelery repair profession.

To ensure the proper soldering composition in the practice of this invention, a wide variety of chemical compositions of soldering are available to those of ordinary skill-in-the-art. Some of the more advantageous soldering compositions are listed, these being: tin/antimony, tin/lead, tin/antimony/lead, tin/bismuth, tin/zinc, lead/silver, cadmium/silver, cadmium/zinc, zinc/aluminum, and lead/bismuth/tin, plus other additives for the so called "low-temperature solder."

Preferably, the most desirous soldering composition is the lead/tin soldering composition. More preferable is the lead/tin soldering composition, 40 percent by weight tin to 60 percent by weight lead. Other lead/tin compositions are also desirable—for example, the 50 percent by weight lead to 50 percent by weight tin. Likewise desirable is the 62 percent by weight tine to 30 percent by weight lead. Other percentage variations of the lead-tin compositions are contemplated for inclusion in this invention.

The following examples are included herein to assist those skilled in the art to gain a full understanding of this invention. The scope of the invention is defined by the appended claim and is not restricted by the examples:

EXAMPLE 1

A 3½ × 6 × 3/16 inch rectangular, decorative, stained glass pane was continuously edged, manually, with a one-half inch strip of copper metal (36 gauge). At each corner of the rectangular stained glass an envelope fold was made in the strip of copper. A second 3½ × 6 × 3/16 inch rectangular, decorative stained glass pane was identically edged as above. Both metal-edged rectangular glass panes were butted against each other. An overlapping layer of a 60 percent by weight lead and 40 percent by weight tin solder composition was applied by a self-contained minitorch soldering gun at approximately 425° to 500° F to the strips of copper metal so as to permit the soldering composition to overlap the strips of copper. This soldering composition was permitted to air dry. This above process was identically repeated until the desired decorative, stained glass configuration was completed.

EXAMPLE 2

A 3½ × 6 × 3/16 inch rectangular, decorative, stained glass pane was continuously edged, manually, with a one-half inch strip of nickel (36 gauge). At each corner of the rectangular stained glass an envelope fold was made in the strip of nickel. A second 3 × 6 × 3/16 inch rectangular, decorative stained glass pane was identically edged as above. Both metal-edged rectangular glass panes were butted against each other. An overlapping layer of a 60 percent by weight lead and 40 percent by weight tin solder composition was applied by a self-contained minitorch soldering gun at approximately 425° to 500° F to the strips of nickel metal so as to permit the soldering composition to overlap the strips of nickel. This soldering composition was permitted to air dry. This above process was identically repeated until the desired decorative, stained glass configuration was completed.

EXAMPLE 3

A 3½ × 6 × 3/16 inch rectangular, decorative, stained glass pane was continuously edged, manually, with a one-half inch strip of lead metal (36 gauge). At each corner of the rectangular stained glass an envelope fold was made in the strip of lead. A second 3½ × 6 × 3/16 inch rectangular, decorative stained glass pane was identically edged as above. Both metal-edged rectangular glass panes were butted against each other. An overlapping layer of a 60 percent by weight lead and 40 percent by weight tin solder composition was applied by a self-contained minitorch soldering gun at approximately 425° to 500° F to the strips of lead metal so as to permit the soldering composition to overlap the strips of lead. This soldering composition was permitted to air dry. This above process was identically repeated until the desired decorative, stained glass configuration was completed.

EXAMPLE 4

A 3½ × 6 × 3/16 inch rectangular, decorative, stained glass pane was continuously edged, manually, with a one-half inch strip of tin metal (36 gauge). At each corner of the rectangular stained glass an envelope fold was made in the strip of tin. A second 3½ × 6 × 3/16 inch rectangular, decorative stained glass pane was identically edged as above. Both metal-edged rectangular glass panes were butted against each other. An overlapping layer of a 60 percent by weight lead and 40 percent by weight tin solder composition was applied by a self-contained minitorch soldering gun at approximately 425° to 500° F to the strips of tin metal so as to permit the soldering composition to overlap the strips of tin. This soldering composition was permitted to air dry. This above process was identically repeated until the desired decorative, stained glass configuration was completed.

EXAMPLE 5

A 3½ × 6 × 3/16 inch rectangular, decorative, stained glass pane was continuously edged, manually, with a one-half inch strip of chromium metal (36 gauge). At each corner of the rectangular stained glass an envelope fold was made in the strip of chromium. A second 3½ ×6 × 3/16 inch rectangular, decorative, stained glass pane was identically edged as above. Both metal-edged rectangular glass panes were butted against each other. An overlapping layer of a 60 percent by weight lead and 40 percent by weight tin solder composition was applied by a self-contained minitorch soldering gun at approximately 425° to 500° F to the strips of chromium metal so as to permit the soldering composition to overlap the strips of chromium. This soldering composition was permitted to air dry. This above process was identically repeated until the desired decorative, stained glass configuration was completed.

WHAT WE CLAIM IS:

1. A joining process for the assembly of decorative, stained glass which comprises: selecting a polygon-edged pane of stained glass; manually positioning a strip of metal selected from the group consisting essentially of copper, nickel, lead, tin and chromium, along the polygon-edged pane of stained glass; selecting a second polygon-edged pane of stained glass and manually positioning a second strip of metal selected from the group consisting essentially of copper, nickel, lead, tin and chromium, along the second polygon-edged pane of stained glass; juxtapositioning the polygon-edged pane of stained glass with the second polygon-edged pane of stained glass; joining the strip of metal to the second strip of metal with an appropriate soldering torch means by a soldering composition selected from the group consisting essentially of tin, lead, antimony, bismuth, cadmium and aluminum; forming the jointed polygon-edged stained glass to the desired configuration; and, allowing the soldering composition to air dry.

2. A joining process for the assembly of decorative, stained glass as claimed in claim 1, wherein the stained glass is rectangular in shape.

3. A joining process for the assembly of decorative, stained glass as claimed in claim 1, wherein the preferred strip of metal is copper.

4. A joining process for the assembly of decorative, stained glass as claimed in claim 1, wherein the preferred soldering composition is a lead-tin composition.

5. A joining process for the assembly of decorative, stained glass as claimed in claim 4, wherein the composition is a 60 percent lead/40 percent tin composition.

\* \* \* \* \*